United States Patent Office 3,341,570
Patented Sept. 12, 1967

3,341,570
ESTERIFICATION IN THE PRESENCE OF THE CATALYST COMBINATIONS—TIN DIBASIC ACID CARBOXYLATES AND EITHER SULFURIC, BENZENESULFONIC OR TOLUENE SULFONIC ACID
Walter P. Barie, Jr., Pittsburgh, Pa., assignor to Gulf Research & Development Company, Pittsburgh, Pa., a corporation of Delaware
No Drawing. Filed Apr. 1, 1963, Ser. No. 269,744
8 Claims. (Cl. 260—475)

This invention relates to an improved process for the production of esters having improved color from high molecular weight alcohols ($C_4$ and higher).

The use of sulfuric and other strong acids to catalyze ester formation from the reaction of alcohols with organic acids is well known in the art. Acid catalyzed esterification of $C_4$ plus alcohols, particularly the branched or iso type, has been found to result in certain by-product impurities which produce undesirable color-forming bodies. One particularly valuable use for the monomeric esters produced from $C_4$ plus alcohols is as plasticizers, especially as plasticizers in light colored plastics, such as vinyl chloride polymers or copolymers, polyvinyl acetate, cellulose esters, acrylate and methacrylate resins. It is, therefore, of prime consideration to produce monomeric esters suitable as plasticizers which have light colors. Although strong acids, such as sulfuric, may be undesirable from a color producing standpoint, these strong acid catalysts are very desirable to achieve fast reaction rates at reasonable cost.

It has now been discovered that the benefits of the acid catalyzed esterification reaction can be retained and the production of color forming bodies unexpectedly suppressed by the addition to the reaction of an organotin compound having at least one carbon-tin bond.

The preferred organotin compounds have the general formula:

$$R_mSnX_{4-m/V_x}$$

where Sn is tin; $V_x$ is the numerical valence of the X radical; $m$ is an integer between 1 and 4 and is such that the quantity $4-m/V_x$ is an integer between 0 and 3; and where R is selected from the group consisting of an aliphatic radical having between 1 and 18 carbon atoms; an alicyclic radical having between 1 and 3 rings, between 5 and 6 ring carbon atoms and between 5 and 18 carbon atoms per molecule; and an aromatic radical having between 1 and 3 rings and between 6 and 18 carbon atoms per molecule; and where X is selected from the group consisting of the monovalent radicals —R; —OR; —OH; —SnR₃;

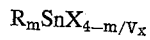

and halide, and the divalent radicals —O— and

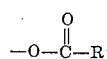

where R is as defined above and R' is a divalent R radical as defined above.

By an "integer between 0 and 3" is meant the whole numbers 0, 1, 2 and 3 inclusive. By halide is meant —F; —Cl, —Br and —I.

Where $m$ in the above general formula is one, then $V_x$ must also be one, so that the quantity $4-m/V_x$ is equal to an integer (in this case 3) between 0 and 3. Where $m$ is one, $V_x$ cannot be 2 (a divalent radical), for then the quantity $4-m/V_x$ would be 1.5, which is not an integer between 0 and 3.

Where $m$ in the above general formula is two, then X can be a single divalent radical or two monovalent radicals.

Where $m$ in the above general formula is three, then X is a single monovalent radical as defined above.

Where $m$ in the above general formula is four, then X is nothing for the quantity $4-m/V_x$ is zero.

Suitable organotin compounds within the general formula given above are:

(1) The tetraalkyltin compounds represented by the general formula:

$$R_4Sn$$

Suitable specific examples of these tetraalkyltin compounds include tetramethyltin, tetraethyltin, tetrapropyltin, tetraisohexyltin, tetraisooctyltin, tetradecyltin, tetratridecyltin, tetraoctadecyltin, tetracyclohexyltin, tetraphenyltin, tetratolyltin, tetrabenzyltin, dimethyldiethyltin, dimethyldicyclohexyltin, trimethylphenyltin, triphenylmethyltin, tetranaphthyltin, tetra-9-phenanthryltin, tetrabiphenyltin, tetra-1-cyclopentadienyltin, and tetra-1-indenyltin.

(2) The alkylalkoxytin compounds represented by the general formula:

$$R_mSn(OR)_{4-m}$$

Suitable specific examples of these alkylalkoxytin compounds include butoxytributyltin, ethoxytriethyltin, dibutyldibutoxytin, diamyldipropoxytin, dibutyldidodecyloxytin, dibutyldioctyloxytin, diphenyldimethoxytin, diphenyldiethoxytin, tributylphenoxytin, and triethylphenoxytin.

(3) The hexalkylditin compounds represented by the general formula:

$$R_3Sn{:}SnR_3$$

Suitable specific examples of these hexalkylditin compounds include hexamethylditin, hexaethylditin, hexacyclohexylditin, hexaphenylditin, hexatolylditin, hexaxylylditin and hexaisooctylditin.

(4) The trialkyltin hydroxides represented by the general formula:

$$R_3SnOH$$

Suitable specific examples of these trialkyltin hydroxides include trimethyltin hydroxide, triethyltin hydroxide, tripropyltin hydroxide, tributyltin hydroxide, triisobutyltin hydroxide, trioctyltin hydroxide, tricyclohexyltin hydroxide, triphenyltin hydroxide, tritolyltin hydroxide, trixylyltin hydroxide, tridecyltin hydroxide and trioctadecyltin hydroxide.

(5) The dialkyltin oxides represented by the general formula:

$$R_2SnO$$

Suitable specific examples of these dialkyltin oxides include dimethyltin oxide, diethyltin oxide, dipropyltin oxide, dibutyltin oxide, diisobutyltin oxide, dihexyltin oxide, dioctyltin oxide, didecyltin oxide, ditridecyltin oxide, dicyclohexyltin oxide, diphenyltin oxide, ditolyltin oxide, dixylyltin oxide, dibenzyltin oxide and dinaphthyltin oxide.

(6) The alkyltin carboxylates represented by the general formula:

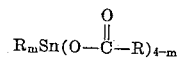

Suitable specific examples of these alkyltin carboxylates include trimethyltin acetate, triethyltin acetate, trimethyltin octoate, trimethyltin laurate, trimethyltin stearate, trimethyltin benzoate, trimethyltin cyclohexoate, triphenyltin acetate, tricyclohexyltin acetate, tritolyltin acetate, trioctyltin oleate, dimethyltin diacetate, diethyltin dilaurate, dioctyltin propionate, didecyltin diacetate, dicyclohexyltin dicyclohexanoate, diphenyltin valerate, diphenyltin dilaurate, dixylyltin dimyristate, methyltin triacetate, ethyltin laurate, phenyltin tripropionate, xylyltin trioctanoate, tolyltin tridecanoate, trimethyltin acrylate, dimethyltin acrylate and dodecyldimethyltin acetate.

(7) The tin dibasic acid carboxylates represented by the general formula:

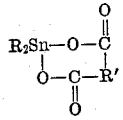

Suitable specific examples of these tin dibasic acid carboxylates include dimethyltin maleate, diethyltin maleate, dipropyltin maleate, dibutyltin maleate, diisobutyltin maleate, diphenyltin maleate, dixylyltin maleate, dimethyltin adipate, dibutyltin adipate, dimethyltin phthalate, diethyltin phthalate, dilauryltin maleate, dimethyltin oxalate, diethyltin succinate and dibutyltin sebacate, and (8) The alkyltin halides represented by the general formula:

$$R_mSnY_{4-m}$$

where Y is a halide radical, —F, —Cl, —Br and —I. Suitable specific examples of these alkyltin halides include trimethyltin chloride, trimethyltin bromide, dimethyltin dichloride, dimethyltin dibromide, dibutyltin dichloride, dibutyltin diiodide, tributyltin chloride, triphenyltin chloride, triphenyltin bromide, tritolyltin chloride, trixylyltin bromide, trilauryltin chloride, trioctyltin bromide, trioctyltin chloride, dioctyltin dichloride, dicyclohexyltin dichloride, dibenzyltin dichloride, octyltin trichloride, dilauryltin dichloride, octadecyltin trichloride and methylcyclohexylphenyltin chloride.

In accordance with the invention, monomeric esters having unexpectedly improved color properties can be prepared by contacting an organic acid reactant with an alcohol reactant having at least 4 carbon atoms and wherein at least one of the two reactants is monofunctional under esterification conditions in the presence of a strong acid catalyst which has a hydrogen ion concentration equivalent to sulfuric acid having an H₂SO₄ content of at least 80 percent and an organotin compound having at least one carbon-tin bond.

This process is particularly applicable to the preparation of light colored esters from alcohols having at least 4 carbon atoms per molecule, preferably between 8 and 37 carbon atoms and most preferred between 8 and 13 carbon atoms per molecule. By an alcohol is meant any organic compound containing between 1 and 4 alcoholic hydroxyl groups, wherein at least one of said alcoholic hydroxyl groups is attached to a carbon atom having at least one substituent hydrogen atom. The monohydric alcohols can be represented by the general formula:

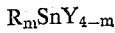

where R is as defined for the organotin compound above, and R″ is selected from the group consisting of R as defined above and hydrogen, and wherein the sum of the carbon atoms in R and R″ is at least three. Specific examples of suitable monohydric alcohols include n-butyl; isobutyl; sec-butyl; n-amyl; isoamyl; 2-methylpentanol-3; n-octyl; 7-methylheptanol-1; capryl; 8-methylnonanol-1; lauryl; 11-methyldodecanol-1; tetradecyl; hexadecyl; stearyl; benzyl; phenylethyl; o, m and p-methylbenzyl; hexanol-3; decanol-4; dodecanol-5; allyl; 2-octenol-1; 3-nonenol-1; 4-decenol-1; 5-dodecenol-1; 6-dodecenol-2; 5-octacosenol-16; 4-tricontenol-12; heptacontanol-14; and cyclohexanol.

Mixtures of these alcohols can also be employed. Particularly suitable mixtures are the reaction products obtained by the hydroformylation and subsequent hydrogenation of at least one olefin having between 3 and 19 carbon atoms per molecule, and more particularly those mixtures of alcohols obtained as the reaction product of the hydroformylation and subsequent hydrogenation of at least one olefin having between 7 and 12 carbon atoms per molecule. For example, hexyl, isooctyl, decyl and tridecyl oxo alcohols are available commercially.

Polyhydric alcohols containing between 2 and 4 alcoholic hydroxyl groups (e.g., glycols) can also be employed. In general, the polyhydric alcohols which are used as reactants in the process of this invention have between 4 and 30 carbon atoms per molecule and preferably have between 4 and 15 carbon atoms per molecule. Suitable examples of polyhydric alcohols include butylene glycol; pentadecane-1, 15-diol; pentamethylene glycol; neopentylglycol; 1,2,3-trihydroxy butane; trimethylol heptane; and pentaerythritol.

An alcohol, such as defined above, is reacted with an organic acid to produce the desired ester. By an organic acid is meant any compound containing between 1 and 8 carboxyl groups, —COOH, or the inner anhydride derivatives thereof, which compound does not form a polyester by intermolecular condensation with itself. The preferred organic acids are those wherein the only functional groups are between 1 and 8 carboxyl groups, —COOH, or the inner anhydride derivatives thereof. The preferred organic acids have between 1 and 4 carboxyl groups per molecule. The organic acid can have between 2 and 30 carbon atoms per molecule with preferred organic acids having between 2 and 20 carbon atoms per molecule.

Suitable organic acids include any aliphatic, alicyclic or aromatic mono- or polycarboxylic acid or inner anhydride derivative thereof. By an inner anhydride derivative thereof is meant a cyclic anhydride formed by the elimination of water and cyclization of two carboxyl groups on the same molecule. The alicyclic acids can have between 5 and 6 ring carbon atoms and between 1 and 3 rings. The aromatic acids can have between 1 and 3 rings. Monohydroxy, monohalo, monoamino and monoketo organic acids can also be employed so long as they do not form polyesters by intermolecular condensation with themselves. The most preferred organic acids are the aromatic carboxylic acids or the inner anhydride derivatives thereof having between 1 and 2 rings, between 2 and 4 carboxyl groups per molecule and wherein the only functional groups are the carboxyl groups. Examples of suitable organic acids include acetic; propionic; butyric; isobutyric; valeric; hexanoic; heptanoic; octanoic; pelargonic; lauric; myristic; palmitic; stearic; decanoic; tridecanoic; acrylic; methacrylic; crotonic; maleic; fumaric; vinylacetic; undecylenic; linolenic; cyclopropanecarboxylic; cyclobutanecarboxylic; cyclopentanecarboxylic; cyclohexylcarboxylic; cycloheptanecarboxylic; benzoic; phenylacetic; phenylpropionic; triphenylacetic; o,m, and p-phthalic; para-nitrobenzoic; para-chlorobenzoic; para-dodecylbenzoic; alpha-naphthoic; beta-naphthoic; pyruvic; levulinic; benzoylacetic; alpha-benzoylbutyric; alpha-aminoisobutyric; beta-aminopropionic; o,m, or p-hydroxybenzoic; ethoxy acetic; alpha-ethoxyisobutyric; furfuroic; alpha-fluoropropionic; beta-bromopropionic; alpha-chloroacetic; trifluoroacetic; malonic; succinic; glutaric; adipic; pimelic; azelaic; sebacic; pentadecane-1,15-dicarboxylic; pentacosane-1,25-dicarboxylic; cyclohexane-1,2-dicarboxylic; benzophenonedicarboxylic; 1,2,3-propanetricarboxylic acid; trimellitic; 1,3,5 - cyclohexanetricarboxylic; pyromellitic; 3,4,3′,4′-benzophenonetetracarboxylic; 2,3, 5,6,2′,3′,5′,6′ - benzophenoneoctacarboxylic; lactic; beta-hydroxypropionic; alpha-hydroxybutyric; beta-hydroxybutyric; succinic anhydride; glutaric anhydride; maleic anhydride; citraconic anhydride; itaconic anhydride; phthalic anhydride; pyromellitic dianhydride; 3,4,3′,4′-benzophenonetetracarboxylic dianhydride; and 2,3,5,6,2′, 3′,5′,6′-benzophenoneoctacarboxylic tetraanhydride.

The method of this invention is suited to the reaction of a polycarboxylic acid with a monohydric alcohol or

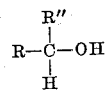

the reaction of a monocarboxylic acid with a mono- or polyhydric alcohol, i.e., at least one of the two reactants must be monofunctional. If both reactants are polyfunctional, the preparation of monomeric esters is not effected but resinous polymeric products result. Certain hydroxy carboxylic acids, such as 5-hydroxyvaleric acid; and 6-hydroxycaprylic can react with themselves to form a polyester. These types of acids are excluded by the above definition. This process is especially suitable for the esterification of alcohols having 4 carbon atoms or more, since the higher molecular weight alcohols tend, in the presence of strong acid catalysts, to produce esters having undesirably high colors.

Theoretically, to produce an ester, one mol of a monohydric alcohol is needed for each mol of a monocarboxylic acid. When a polyfunctional reactant is employed, a molar increase in the monofunctional reactant corresponding to the number of functional groups in the polyfunctional reactant must be employed to obtain a theoretically complete reaction. The degree of completion and completion rate are improved, however, by the presence of a molar excess of one or the other of the reactants over the theoretical amount needed for complete conversion. It is preferred for ease of recovery to have an excess within the reaction zone of that reactant which distills at the lower temperature. Since at least one of the reactants may be polyfunctional, it is preferred to discuss the molar ratio of reactants in terms of the molar ratio of alcoholic hydroxyl groups in the alcohol reactant to carboxyl groups in the organic acid reactant. As noted above, the term "organic acid" is meant to include the inner anhydride derivatives thereof. The number of carboxyl groups per molecule of inner anhydride is taken to mean the number of carboxyl groups which would be present in the hydrated form of the anhydride. Thus, phthalic and maleic anydrides would be considered to have two carboxyl groups per molecule. Thus, the molar ratio of alcoholic hydroxyl groups in the alcohol reactant to carboxyl groups in the organic acid reactant can be between 1:30 and 30:1 with preferred molar ratios between 1:5 and 5:1.

To illustrate the above, if one mol of octyl alcohol is employed as the alcohol reactant and a 1:1 molar ratio of alcoholic hydroxyl groups in the alcohol reactant to carboxyl groups in the organic acid reactant is desired, then the molar amounts of acetic acid (a monocarboxylic acid); adipic acid (a dicarboxylic acid); phthalic anhydride and pyromellitic dianhydride as the organic acid reactants should be 1; 0.5; 0.5; and 0.25 respectively.

Any strong acid can be employed as the catalyst. By a strong acid is meant any compound which has a hydrogen ion concentration equivalent to sulfuric acid having an $H_2SO_4$ content of at least 80 percent. These strong acids are well known in the art and include both organic and inorganic acids. Suitable organic acids include p-toluene sulfonic acid; benzene sulfonic; dodecylbenzene sulfonic; and ethane sulfonic. Suitable inorganic acids include the strong mineral acids, such as sulfuric, nitric and hydrochloric.

One preferred group of acids are the organo-sulfonic acids which can be represented by the general formula:

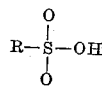

where R is the same as R defined for the organotin compounds above. The most preferred organo-sulfonic acids are the aryl sulfonic acids, such as benzene sulfonic acid and p-toluene sulfonic acid.

The strong mineral acids have about the same hydrogen ion concentration and can be used in a concentration of between 80 and 100 percent, preferably 90–100 percent, and most preferably between 95 and 100 percent. The organic and strong inorganic acids should be used in a concentration which has a hydrogen ion content equivalent to sulfuric acid having an $H_2SO_4$ content of at least 80 percent.

The concentration of the acid catalyst (based on 100 percent acid) in the reaction mixture can vary between 0.001 to 5 weight percent, based on the theoretical weight of expected ester, with preferred concentrations between 0.01 and 2 weight percent. The most preferred concentration of acid catalyst is between 0.1 and 1 weight percent based on the theoretical weight of expected ester. Thus, if sulfuric acid having an $H_2SO_4$ content of 90 percent is employed, then the weight of pure acid catalyst would be calculated by multiplying the actual weight in grams of 90 percent sulfuric acid by 0.90. Thus, if 1,000 grams of dioctylphthalate were to be produced by the reaction of phthalic anhydride and octyl alcohol in the presence of 2 grams of sulfuric acid having an $H_2SO_4$ content of 90 percent, then the weight percent acid catalyst in the reaction mixture based on the theoretical weight of expected ester would be the grams of 100 percent sulfuric acid (2 grams times 0.90) divided by the grams of expected ester (1,000 grams) times 100 or 0.18 weight percent.

The organotin compounds as defined above in some unknown manner suppress the formation of color bodies during the esterification reaction. These organotin compounds will catalyze the esterification reaction alone, but a much longer reaction time is required. Good light-colored esters are, however, obtained using the organotin compounds above. It was unexpected, however, that by adding these organotin compounds to a strong acid catalyzed reaction that the benefits of both reactions should be achieved along with the disadvantages of neither; that is, a fast reaction time is achieved with the production of esters having improved colors. The amount of the tin compound, based on the tin alone, required to suppress the formation of color bodies can be between 0.001 and 5 weight percent tin based on the total weight of the expected ester products, with preferred amounts between 0.01 and 2 weight percent tin.

The function of reaction temperature is to increase the rate of reaction. In general, the temperature of reaction can be between 70° C. and 300° C. depending upon the boiling point of the chosen reactants. The best temperature to be employed for any particular acid or alcohol may readily be determined by one skilled in the art. In general, the higher molecular weight alcohols and acids react more slowly and the higher reaction temperatures are desired to increase the reaction rate. The temperature of the reaction must be high enough to remove the water of esterification, but not so high that the acid or alcohol charge stock is removed. It is sometimes preferable to employ an azeotroping agent, such as benzene, to remove the water and thus allow for the use of lower reaction temperatures. Preferred reaction temperatures are between 100° C. and 250° C. with the most preferred reaction temperatures being between 135° C. and 200° C.

Any reaction pressure can be employed. Atmospheric pressure is preferred. The use of lower reaction pressures allows the use of lower reaction temperatures since the water of esterification will be removed more easily. The use of pressures in excess of atmospheric allows the use of higher temperatures. Thus, pressures between 5 and 250 p.s.i.a., or higher can be employed with the preferred pressure being atmospheric pressure. Reaction conditions that are best suited for the type and concentration of alcohol, organic acid and catalyst and for the particular apparatus may readily be determined by one skilled in the art familiar with such processes, in accordance with the teachings above.

It is usually desirable to maintain an inert atmosphere, such as nitrogen gas, over the reaction mixture to reduce oxidation of the charge stock and products.

The reaction time is usually between 0.5 and 30 hours or more depending on the particular reactants and the degree of completion desired. In general, the lower molecular weight and monofunctional reactants react more quickly. Reaction times less than 30 minutes usually result in conversions which are too low while the reaction times above about 30 hours are usually impractical.

It is preferred that the reactants be liquid under reaction conditions and, in addition, it is preferred that the reactants be miscible. In many instances, however, the acid reactant is a solid polycarboxylic acid, for example citric acid, whose solubility in organic alcohols, particularly the higher alcohols, may be limited. In certain instances, therefore, it may be desirable to employ a common inert solvent or diluent to dissolve those reactants before entering the reaction zone. These solvents sometimes serve a dual function of an azeotroping agent to remove the water of esterification. Any diluents which would react with the charge components should, of course, be avoided. Suitable diluents include saturated aliphatic and alicyclic hydrocarbons having between 5 and 30 carbon atoms per molecule and preferably between 5 and 16 carbon atoms per molecule, and aromatic hydrocarbons having between 1 and 3 rings and between 6 and 18 carbon atoms per molecule. Suitable specific examples of inert diluents include pentane; hexane; heptane; decane; cetane; cyclohexane; cyclopentane; benzene; toluene; o-xylene; m-xylene and p-xylene.

The invention will be further described with relation to the following specific examples.

In all of the examples the following procedure was employed except where otherwise indicated. The organic acid reactant for all of the examples was phthalic anhydride. The alcohol reactant was either a mixture of isooctyl or tridecyl oxo alcohols obtained by the hydroformylation and subsequent hydrogenation of a mixture of branched-chain heptenes or branched-chain $C_{12}$ olefins, respectively. The mixture of branched-chain heptenes was the 87° F. to 94° F. fraction of the product from the alkylation of propylene and butene. The $C_{12}$ olefins were the 186° F. to 195° F. fraction of the product from the sulfuric acid polymerization of propylene.

In each run, one mol (148 grams) of phthalic anhydride, except where otherwise indicated, was reacted with approximately 2.1 mols of the oxo alcohol (5% excess) at a temperature of 180° C. using a nitrogen purge gas (0.13 liter per minute). Fifty milliliters of heptane were added, along with the desired catalyst or catalyst mixture. The heptane was added as an azeotroping agent as an aid in removing the water overhead. The rate of esterification was followed by measuring the water of esterification at various time intervals.

In each example the product was treated with a 1% sodium hydroxide solution until basic to pH paper. The aqueous alkaline layer was removed and the organic layer was washed with hot water (70° to 80° C.) until the washing was neutral to pH paper. The product was distilled at reduced pressure (100 to less than one mm. of Hg) to remove the water and the heptane. Any unreacted alcohol was also removed at reduced pressure (less than 1 mm. of Hg). The distillation temperature was then taken to 150° C. for isooctyl alcohol, 175° C. for decyl alcohol and 200° C. for tridecyl alcohol at the reduced pressure. The product was then treated with 2 grams of activated carbon (about 0.5% by weight) at 90° C. for one-half hour and filtered using Celite and a fritted glass filter.

*Example 1*

In the run for this example, 2.1 mols (420 grams) of tridecyl alcohol, whose properties are given in Table I below, was reacted with phthalic anhydride as described above using 1.32 grams of sulfuric acid having an $H_2SO_4$ content of 96 percent and 3.86 grams (0.25 percent by weight of the expected ester) of weight tin based on the weight of the expected ester) of dibutyltin maleate. The sulfuric acid amounted to 0.25 percent by weight of the final ester, based on 100 percent sulfuric acid. The weight ratio of 100 percent sulfuric acid to tin in the reaction mixture was 1:1. The reaction time was 30 minutes. The theoretical saponification number is 211.0. The saponification number by ASTM method D-94 was 211.4 showing the product to be very pure. The percent conversion was 100 based on water recovered. The ester was recovered in a 91 percent yield, the remainder being handling losses which could be recovered by more care in purifying. The color by ASTM test method D-1209-54 (hereinafter called APHA color) was 80.

TABLE I.—TYPICAL INSPECTIONS OF ALCOHOLS

| | Isooctyl Alcohol | Tridecyl Alcohol |
|---|---|---|
| Specific Gravity 20°/20° C. (68°/68° F.) | 0.833 | 0.845 |
| Color, APHA (by ASTM D-1209-54) | 3 | 3 |
| Refractive Index, $n_D^{20}$ | 1.4312 | 1.4473 |
| Sulfur, p.p.m. | 3 | 1 |
| Water, percent by weight | 0.020 | 0.008 |
| Acidity as Acetic Acid, percent by weight | 0.001 | 0.003 |
| $C_8$ Carbonyl Content, percent by weight | 0.01 | |
| $C_{13}$ Carbonyl Content, percent by weight | | 0.04 |
| Distillation: ASTM D1078: | | |
| Initial Boiling Point, ° C | 185 | 254.9 |
| Dry Point, ° C | 188.5 | 262.9 |

*Example 2*

Example 1 was repeated except the dibutyltin maleate was not employed. The saponification number of the product was 213.7 but the APHA color had increased to 300. The percent conversion was 100 percent and the yield of recovered ester was 91.6.

A comparison of Examples 1 and 2 shows the highly beneficial effect of employing a color suppressing organotin compound in combination with sulfuric acid in accordance with the teachings of this invention. Thus, a color reduction of 220/300 times 100 or about 73 percent was achieved by the use of an organotin compound in the concentration employed.

*Example 3*

Example 1 was repeated except isooctyl alcohol was substituted for the tridecyl alcohol, the sulfuric acid was not employed and the dibutyltin maleate concentration was increased to 1 percent tin by weight. Six hours were required to achieve a 97.8 percent conversion. The saponification number of the product which was 290.7 compared to a theoretical saponification number of 286.8. An APHA color of 20 was achieved. Although different alcohol charge stocks were employed in Examples 1 and 3, it is interesting to note that a reaction time twelve times as long was required for the conversion of isooctyl alcohol using a higher concentration of dibutyltin maleate compared to the 30-minute reaction time using sulfuric acid or sulfuric acid and an organotin compound for the conversion of tridecyl acohol. It is generally conceded in the art that the lower molecular weight alcohols react faster than the higher molecular weight alcohols. The properties of the isooctyl alcohol are given in Table I above.

*Example 4*

Example 3 was repeated except the tin concentration was reduced to 0.1 percent. The percent conversion, again 6 hours, dropped to 87.0 percent, showing that a decreased concentration of dibutyltin maleate does have an effect on the percent conversion or reaction rate. The APHA color of the product from Example 4 was slightly higher at 25.0 and the saponification number was 287.7.

*Example 5*

Example 2 was repeated except the sulfuric acid concentration calculated as 100 percent sulfuric acid, was reduced to 0.10 percent by weight of the expected ester product and the reaction time was increased to 60 minutes. The saponification number of the product was 212.9 compared to a theoretical saponification number of 211.0.

The APHA color was 150. The percent conversion was 100 based on the water recovery. The weight percent yield of ester product was 90 percent.

*Example 6*

Example 5 was repeated except 0.41 gram (0.025 weight percent tin based on the weight of the final ester) of dibutyltin maleate was added to the reaction mixture. The weight ratio of 100 percent sulfuric acid to tin in the reaction mixture is 1:4. The saponification number of the product was 212.2. A conversion of 100 percent was achieved based on the water recovery. The weight percent yield was 86.5. The APHA color was 110. This shows a color reduction of about 27 percent.

A comparison of Examples 5 and 6 with Examples 1 and 2 shows that while concentrations of 0.025 weight percent tin (based on the weight of the final ester) improve the color of the resulting ester over the use of sulfuric acid alone, the improvement in color is not nearly so great (27 percent reduction) as when the greater concentrations of the tin compound are employed (73 percent reduction).

Further experiments showed that a weight ratio of tin (as dibutyltin maleate) to 100 percent sulfuric acid in the reaction mixture as low as 1:10 still resulted in a color reduction of about 30 percent (compared to the use of sulfuric acid alone) for an ester prepared by the reaction of oxo tridecyl alcohol and phthalic anhydride.

*Example 7*

Example 5 was repeated except 0.5 gram (0.10 weight percent tin) $SnCl_2$ was added and only 0.5 mol of phthalic anhydride was used. The reaction time was 75 minutes. The saponification number of the product was 211.3. A conversion of 100 percent was achieved, based on the recovered water of esterification. The actual recovered yield of ester was 85.0 percent. The APHA color was 175.

A comparison of Example 7 with Examples 5 and 6 shows that the use of tin compounds which do not have at least one carbon-tin bond result, when used in admixture with sulfuric acid, in the production of esters having darker colors than when using the sulfuric acid alone.

Resort may be had to such variations and modifications as fall within the spirit of the invention and the scope of the appended claims.

I claim:

1. A process for the production of a monomeric ester having improved color which comprises contacting an aromatic organic acid reactant having between 1 and 4 carboxyl groups per molecule with a saturated unsubstituted aliphatic alcohol reactant having between 4 and 37 carbon atoms per molecule and wherein at least one of the two reactants is monofunctional under esterification conditions in the presence of a strong acid catalyst selected from the group consisting of sulfuric acid, benzene sulfonic acid and paratoluene sulfonic acid wherein said strong acid catalyst has a hydrogen ion concentration equivalent to sulfuric acid having an $H_2SO_4$ content of at least 80 percent and a tin dibasic acid carboxylate having the general formula:

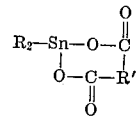

where R is selected from the group consisting of an acyclic saturated or olefinically unsaturated hydrocarbon radical having between 1 and 18 carbon atoms; phenyl or a monocyclic alkaryl radical having between 6 and 18 carbon atoms when R' is a divalent saturated or olefinically unsaturated hydrocarbon radical having from 1 to 18 carbon atoms, and where R is selected from the group consisting of an acyclic saturated or olefinically unsaturated hydrocarbon radical having between 1 and 18 carbon atoms when R' is phenylene.

2. A process according to claim 1 wherein said strong acid catalyst is sulfuric acid having an $H_2SO_4$ content of at least 80 percent.

3. A process according to claim 2 wherein the aromatic organic acid reactant is phthalic anhydride.

4. A process according to claim 1 wherein the tin compound is dibutyltin maleate.

5. A process according to claim 2 wherein the alcohol reactant comprises the reaction product obtained by the hydroformylation of at least one olefin having between 7 and 12 carbon atoms per molecule.

6. A process according to claim 5 wherein the aromatic organic acid reactant is phthalic anhydride.

7. A process according to claim 6 wherein the tin compound is dibutyltin maleate.

8. A process for the production of a monomeric ester having improved color which comprises contacting phthalic anhydride with an alcohol reactant comprising the reaction product obtained by the hydroformylation of at least one olefin having between 7 and 12 carbon atoms per molecule in the presence of a strong acid catalyst comprising sulfuric acid having an $H_2SO_4$ content between 80 and 100 percent and dibutyltin maleate wherein the molar ratio of the alcohol reactant to phthalic anhydride is between 30:1 and 1:30, wherein the amount of sulfuric acid is between 0.001 and 5 weight percent of the expected ester and wherein the amount of dibutyltin maleate is between 0.001 and 5 weight percent tin based on the weight of the expected ester product.

References Cited

FOREIGN PATENTS 810,381  3/1959  Great Britain.

LORRAINE A. WEINBERGER, *Primary Examiner.*

THOMAS L. GALLOWAY, *Assistant Examiner.*